United States Patent
Kusaba et al.

(10) Patent No.: US 9,847,182 B2
(45) Date of Patent: Dec. 19, 2017

(54) ELECTRIC STORAGE APPARATUS CONFIGURED TO PASS A HEAT EXCHANGE MEDIUM

(71) Applicant: TOYOTA JIDOSHA KABUSHIKI KAISHA, Toyota-shi, Aichi (JP)

(72) Inventors: Kosuke Kusaba, Inazawa (JP); Nobuyoshi Fujiwara, Toyota (JP); Kazuma Asakura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 14/438,277

(22) PCT Filed: Nov. 30, 2012

(86) PCT No.: PCT/JP2012/007716
§ 371 (c)(1),
(2) Date: Apr. 24, 2015

(87) PCT Pub. No.: WO2014/083600
PCT Pub. Date: Jun. 5, 2014

(65) Prior Publication Data
US 2015/0255225 A1    Sep. 10, 2015

(51) Int. Cl.
*H01M 10/60* (2014.01)
*H01G 11/04* (2013.01)
(Continued)

(52) U.S. Cl.
CPC .......... *H01G 11/04* (2013.01); *H01M 2/1077* (2013.01); *H01M 2/204* (2013.01);
(Continued)

(58) Field of Classification Search
None
See application file for complete search history.

(56) References Cited

U.S. PATENT DOCUMENTS

| | | |
|---|---|---|
| 2003/0134189 A1 | 7/2003 | Kanai et al. |
| 2005/0095499 A1 | 5/2005 | Kanai et al. |
| (Continued) | | |

FOREIGN PATENT DOCUMENTS

| | | |
|---|---|---|
| JP | 2003-257394 A | 9/2003 |
| JP | 2009-123371 A | 6/2009 |
| KR | 2011-0059796 A | 6/2011 |

*Primary Examiner* — Lucas J. O'Donnell
(74) *Attorney, Agent, or Firm* — Oliff PLC

(57) ABSTRACT

An electric storage apparatus includes a plurality of electric storage elements, a bus bar electrically connecting the plurality of electric storage elements, and a case housing the plurality of electric storage elements. Each of the electric storage elements extends in a predetermined direction and has a positive electrode terminal and a negative electrode terminal at both ends in the predetermined direction. The plurality of electric storage elements are aligned in a plane orthogonal to the predetermined direction. The case has an opening portion configured to pass a heat exchange medium therethrough and extending in the predetermined direction. A portion of the bus bar extends in the predetermined direction and is disposed along a wall face of the case having the opening portion formed therein, the portion being disposed at a position different from a position of the opening portion.

12 Claims, 5 Drawing Sheets

(51) Int. Cl.
*H01M 2/10* (2006.01)
*H01M 2/20* (2006.01)
*H01M 10/625* (2014.01)
*H01M 10/655* (2014.01)
H01M 10/643 (2014.01)
H01M 10/6551 (2014.01)
H01M 10/6561 (2014.01)

(52) U.S. Cl.
CPC ......... *H01M 2/206* (2013.01); *H01M 10/625* (2015.04); *H01M 10/655* (2015.04); *H01M 10/643* (2015.04); *H01M 10/6551* (2015.04); *H01M 10/6561* (2015.04)

(56) References Cited

U.S. PATENT DOCUMENTS

| | | | |
|---|---|---|---|
| 2011/0039142 A1* | 2/2011 | Kwag | H01M 2/105 429/99 |
| 2011/0104540 A1* | 5/2011 | Lee | H01M 2/14 429/94 |
| 2011/0195284 A1 | 8/2011 | Yasui et al. | |

* cited by examiner

ELECTRIC STORAGE APPARATUS CONFIGURED TO PASS A HEAT EXCHANGE MEDIUM

TECHNICAL FIELD

The present invention relates to an electric storage apparatus including a plurality of electric storage elements electrically connected to each other.

BACKGROUND ART

An assembled battery may be configured by electrically connecting a plurality of cells through a bus bar. For example, in Patent Document 1, a so-called cylinder-type battery is used as a cell, and a plurality of such cylinder-type batteries are electrically connected to each other by using a lead (bus bar). The lead is disposed at each end of the cylinder-type battery in a longitudinal direction.

In Patent Document 1, an exterior case for housing the plurality of cylinder-type batteries is provided with an air blow port and an air exhaust port. Air is taken in through the air blow port and is let out through the air exhaust port to cool the cylinder-type batteries housed in the exterior case.

PRIOR ART DOCUMENT

Patent Document

[Patent Document 1] Japanese Patent Laid-Open No. 2003-257394

DISCLOSURE OF THE INVENTION

Problems to be Solved by the Invention

When the bus bar is used to electrically connect the plurality of cylinder-type batteries, the bus bar may be extended in the longitudinal direction of the cylinder-type battery. In the configuration described in Patent Document 1, the bus bar (lead) extending in the longitudinal direction of the cylinder-type battery obstructs the air blow port and the air exhaust port. In this case, the bus bar prevents a smooth flow of air to reduce the efficiency in cooling the cylinder-type batteries.

Means for Solving the Problems

According to a first aspect, the present invention provides an electric storage apparatus including a plurality of electric storage elements, a bus bar electrically connecting the plurality of electric storage elements, and a case housing the plurality of electric storage elements. Each of the electric storage elements extends in a predetermined direction and has a positive electrode terminal and a negative electrode terminal at both ends in the predetermined direction. The plurality of electric storage elements are aligned in a plane orthogonal to the predetermined direction. The case has an opening portion configured to pass a heat exchange medium therethrough and extending in the predetermined direction. The heat exchange medium is used to adjust the temperature of the electric storage element. A portion of the bus bar extends in the predetermined direction and is disposed along a wall face of the case having the opening portion formed therein, the portion being disposed at a position different from a position of the opening portion.

According to the present invention, since the electric storage element extends in the predetermined direction, the opening portion of the case extending in the predetermined direction easily guides the heat exchange medium to the entirety of the electric storage element. This allows efficient temperature adjustment for the electric storage element with the heat exchange medium. Since the portion of the bus bar extends in the predetermined direction and is provided at the position different from that of the opening portion, the possibility of the bus bar covering the opening portion of the case can be eliminated to cause the heat exchange medium to smoothly pass (move) through the opening portion.

The smooth passage (movement) of the heat exchange medium through the opening portion aids in guiding the heat exchange medium to the electric storage element to efficiently adjust the temperature of the electric storage element. The portion of the bus bar is disposed along the wall face of the case having the opening portion formed therein, so that the bus bar is prevented from obstructing the movement of the heat exchange medium in the case.

The case can have the plurality of opening portions formed therein. The plurality of opening portions can be aligned in a direction orthogonal to the predetermined direction along the wall face of the case. When the plurality of opening portions are provided, the portion of the bus bar can be located between two of the opening portions adjacent to each other in the direction orthogonal to the predetermined direction. This configuration enables the efficient use of the wall face of the case to place the bus bar and the opening portion with no overlap.

The opening portion can be used as an opening portion used to supply the heat exchange medium to the electric storage element. In this case, during the supply of the heat exchange medium to the electric storage element through the opening portion, the heat exchange medium passing through the opening portion can be prevented from being obstructed by the bus bar. The heat exchange medium can be efficiently supplied to the electric storage element.

The opening portion can be used as an opening portion used to exhaust the heat exchange medium after heat exchange with the electric storage element. In this case, during the exhaust of the heat exchange medium after the heat exchange, the heat exchange medium passing through the opening portion can be prevented from being obstructed by the bus bar. The heat exchange medium can be efficiently exhausted. This leads to the efficient supply of the heat exchange medium to the electric storage element.

The bus bar can be disposed outside the case. When the electric storage element is charged or discharged, an electric current passes through the bus bar, and the bus bar produces heat in response to the passage of electric current. The heat exchange medium is supplied into the case. If the bus bar is disposed inside the case, the heat of the bus bar may be transferred to the heat exchange medium or the electric storage element.

In cooling the electric storage element using the heat exchange medium, the heat of the bus bar may be transferred to the heat exchange medium or the electric storage element to reduce the cooling performance of the electric storage element with the heat exchange medium. To address this, the bus bar can be disposed outside the case to prevent the heat produced in the bus bar from being transferred to the heat exchange medium or the electric storage element.

The bus bar can be formed of a first area, a second area, and a third area. The first area includes at least one positive electrode tab connected to the positive electrode terminal and extends in the direction orthogonal to the predetermined direction. The second area includes at least one negative electrode tab connected to the negative electrode terminal and extends in the direction orthogonal to the predetermined direction. The third area extends in the predetermined direction and is connected to the first area and the second area at both ends in the predetermined direction.

The third area can be used to electrically connect the electric storage element connected to the positive electrode tab of the first area and the electric storage element connected to the negative electrode tab of the second area in serial. A plurality of positive electrode tabs can be provided in the first area and a plurality of negative electrode tabs can be provided in the second area to electrically connect the plurality of electric storage elements in parallel.

A connecting portion of the first area connected to the third area and a connecting portion of the second area connected to the third area can be opposite to each other in the predetermined direction. Thus, the third area can be disposed along the predetermined direction. The connecting portions of the first area and the second area can be opposite to each other in the predetermined direction by bringing the connecting portion of the first area closer to the connecting portion of the second area or bringing the connecting portion of the second area closer to the connecting portion of the first area. In addition, the connecting portions of the first area and the second area can be opposite to each other in the predetermined direction by bringing the connecting portion of the first area and the connecting portion of the second area closer to each other.

When the plurality of electric storage elements are aligned in the plane orthogonal to the predetermined direction, the plurality of electric storage elements can be disposed such that all the positive electrode terminals are located in the plane orthogonal to the predetermined direction. In this case, all the negative electrode terminals are also located in the plane orthogonal to the predetermined direction. With this placement of the electric storage elements, all the electric storage elements can have the same orientation with the positive electrode terminals and the negative electrode terminals located at the same positions. When gas produced in the electric storage element is exhausted through the positive electrode terminal or the negative electrode terminal, the exhausted gas is easily collected in a single space. As a result, the structure for exhausting gas can be simplified.

Each of the plurality of electric storage elements can be held by a holder. Specifically, a plurality of opening portions can be formed in the holder and used to individually hold the electric storage elements. The case can surround an area of the electric storage element that is not held by the holder. Since the case has the opening portion formed therein as descried above, the heat exchange medium can be guided to the area of the electric storage element that is not held by the holder.

The bus bar including the portion extending in the predetermined direction is used to allow the plurality of electric storage elements disposed at different positions in the direction orthogonal to the predetermined direction to be electrically connected in serial. The electrically serial connection of the plurality of electric storage elements can locate a positive electrode terminal and a negative electrode terminal of the electric storage apparatus at both ends of the case in the direction orthogonal to the predetermined direction. For electrically connecting a plurality of electric storage apparatuses in serial in this configuration, the positive electrode terminal of one of the electric storage apparatuses can be disposed at a position adjacent to the negative electrode terminal of another one of the electric storage apparatuses. The plurality of the electric storage apparatuses can be easily connected in this manner.

A so-called cylinder-type electric storage element can be used as the electric storage element. The cylinder-type electric storage element has a circular shape in section orthogonal to the predetermined direction. The use of the cylinder-type electric storage element is useful in aligning the plurality of electric storage elements in the plane (in the two-dimensional plane) orthogonal to the predetermined direction. Since an outer face of the electric storage element is formed of a curved face, the heat exchange medium can be moved smoothly along the outer face (curved face) of the electric storage element when the plurality of the electric storage elements are aligned in the two-dimensional plane.

MODE FOR CARRYING OUT THE INVENTION

A preferred embodiment of the present invention will hereinafter be described.

Embodiment 1

Figure 1:
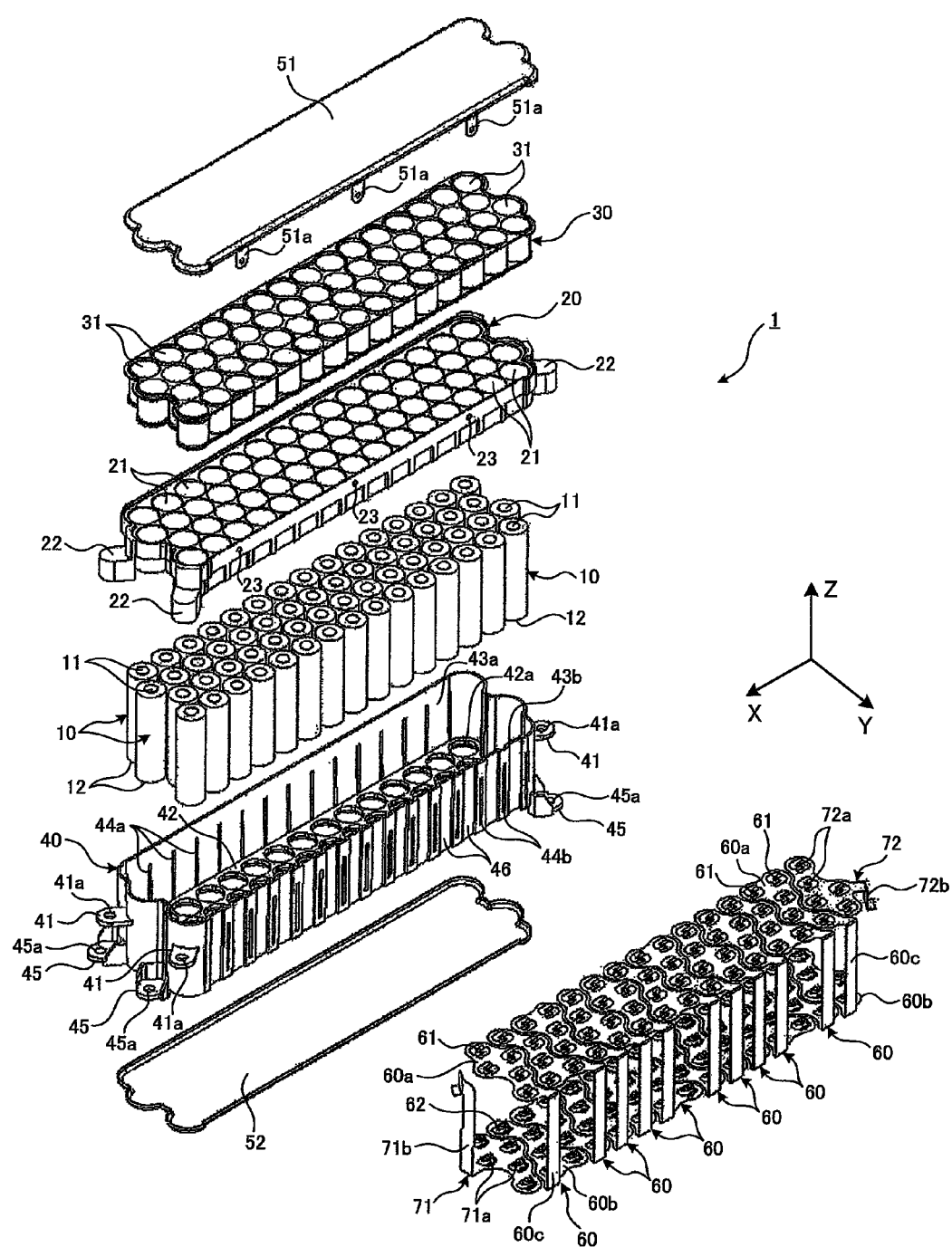
FIG. 1 An exploded view of a battery module.
Figure 2:
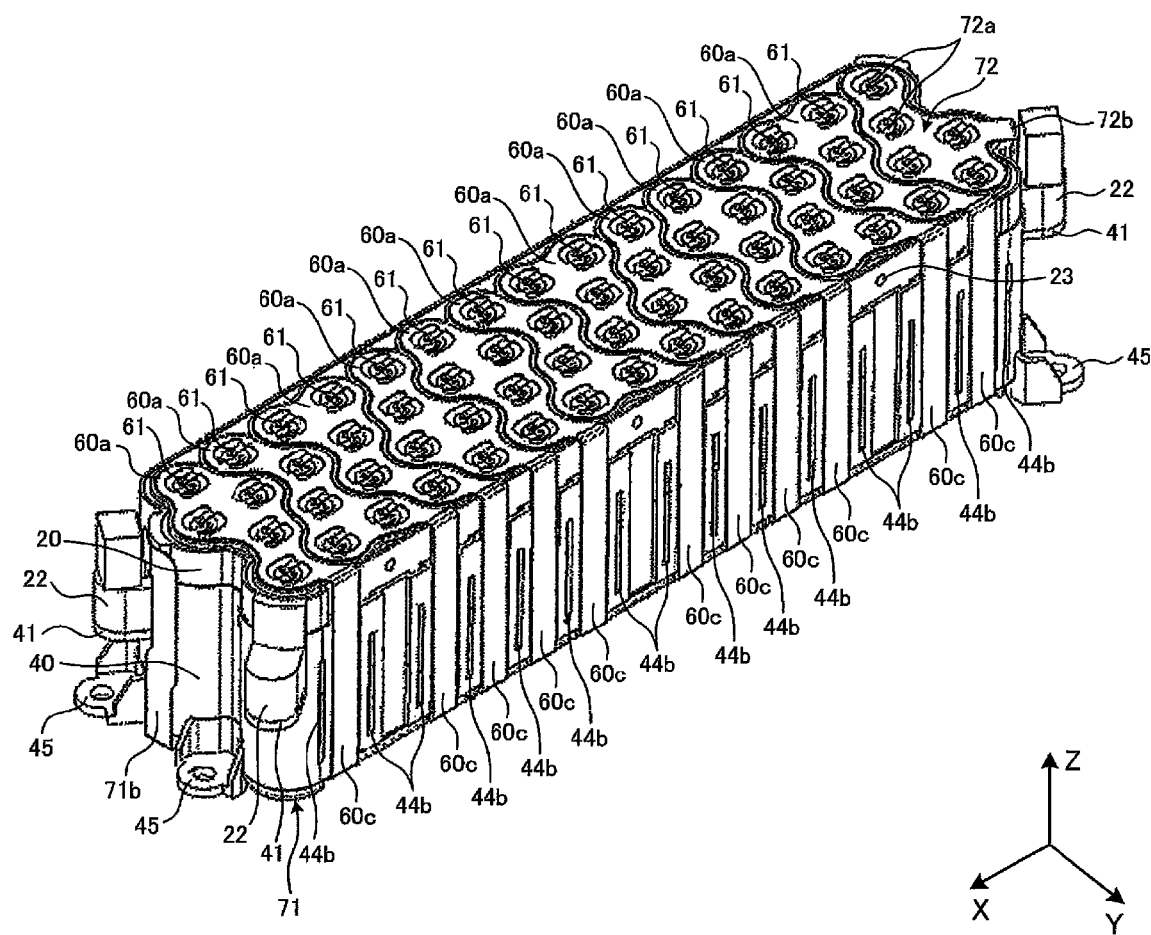
FIG. 2 An external view of the battery module.

A battery module (corresponding to an electric storage apparatus) which is Embodiment 1 of the present invention is first described. FIG. 1 is an exploded view of the battery module which is the present embodiment. FIG. 2 is an external view of the battery module. In FIG. 1 and FIG. 2, an X axis, a Y axis, and a Z axis are axes orthogonal to each other. In the present embodiment, an axis corresponding to a vertical direction is defined as the Z axis. The relationship between the X axis, the Y axis, and the Z axis shown in FIG. 1 applies to the other figures.

The battery module 1 includes a plurality of cells (corresponding to electric storage elements) 10. The cell 10 is a so-called cylinder-type battery which includes a power-generating element housed in a battery case formed in a cylindrical shape. A secondary battery such as a nickel metal hydride battery or a lithium-ion battery can be used as the cell 10. Instead of the secondary battery, an electric double layer capacitor can be used.

The power-generating element is an element responsible for charge and discharge and includes a positive electrode plate, a negative electrode plate, and a separator disposed between the positive electrode plate and the negative electrode plate. The separator is impregnated with an electrolytic solution. The positive electrode plate includes a collector plate and a positive electrode active material layer formed on a surface of the collector plate. The positive electrode active material layer includes a positive electrode active material, a conductive material, a binder and the like. The negative electrode plate includes a collector plate and a negative electrode active material layer formed on a surface of the collector plate. The negative electrode active material layer includes a negative electrode active material, a conductive material, a binder and the like. The positive electrode active material layer and the negative electrode active material layer are also impregnated with the electrolytic solution.

The cell 10 extends in the Z direction and is provided with a positive electrode terminal 11 and a negative electrode terminal 12 at both ends of the cell 10 in a longitudinal direction (Z direction). A battery case serving as the exterior of the cell 10 is formed of a case body and a lid. The case body is formed in a cylindrical shape and accommodates the power-generating element described above. The case body has an opening portion formed therein for inserting the power-generating element, and the opening portion is covered with the lid.

A gasket made of an insulating material is disposed between the lid and the case body. This hermetically seals the battery case and insulates the lid from the case body. The lid is formed in a protruding shape and is electrically connected to the positive electrode plate of the power-generating element. The lid is thus used as the positive electrode terminal 11 of the cell 10. The case body is electrically connected to the negative electrode plate of the power-generating element and is thus used as the negative electrode terminal 12 of the cell 10. In the present embodiment, the end face of the case body that is opposite to the lid (positive electrode terminal 11) in the Z direction is used as the negative electrode terminal 12.

A valve is provided in the cell 10 for exhausting gas produced inside the cell 10 to the outside of the cell 10. When the gas is produced to increase the internal pressure of the cell 10 to the operating pressure of the valve, the valve is changed from a closed state to an open state. Once the valve is opened, the gas present in the inside of the cell 10 is exhausted out of the cell 10 through an opening portion provided in the positive electrode terminal 11.

As shown in FIG. 1, all the cells 10 constituting the battery module 1 are oriented such that their positive electrode terminals 11 are located at the top. Thus, the positive electrode terminals 11 of the all the cells 10 are aligned in the same plane (X-Y plane). In other words, the negative electrode terminals 12 of all the cells 10 are aligned in the same plane (X-Y plane).

The cells 10 are individually supported by a holder 20. The holder 20 has opening portions 21 through which the associated cells 10 are inserted. The opening portion 21 is formed in a shape (specifically, a circular shape) conforming to an outer peripheral face of the cell 10, and the holder 20 is provided with as many opening portions 21 as the cells 10. The holder 20 can be formed of a material having a high thermal conductivity such as aluminum to easily transfer heat produced in the cell 10 due to charge and discharge or the like to the holder 20. The release of the heat of the cell 10 to the holder 20 can enhance the heat dissipation of the cell 10.

The number of the opening portions 21 in the holder 20 can be set as appropriate. For example, a plurality of cells 10 can be inserted into a single opening portion, and in this case, the number of the opening portions 21 is smaller than the number of the cells 10. The opening portion 21 may be used to dispose another member used in the battery module 1. In this case, the number of the opening portions 21 is larger than the number of the cells 10. Alternatively, the opening portion 21 can hold a single unit including a plurality of cells 10 electrically connected in serial. In this case, a single opening portion 21 can be used to hold a plurality of cells 10.

An insulator 30 is disposed between the opening portions 21 of the holder 20 and the cells 10. The insulator 30 is made, for example of an insulating material such as resin, to insulate the cells 10 from the holder 20. The insulator 30 has opening portions 31 through which the associated cells 10 are inserted. The insulator 30 is provided with as many opening portions 31 as the cells 10. Similarly to the opening portions 21 of the holder 20 described above, the number of the opening portions 31 can be set as appropriate.

The insulator 30 is formed of an elastically deformable material or an adhesive of resin material having a thermosetting property. The insulator 30 can be elastically deformed or the resin of the insulator 30 can fill a gap between the cells 10 and the holder 20 (opening portions 21) to bring the insulator 30 into close contact with the outer peripheral faces of the cells 10 and the opening portions 21 of the holder 20. The elastic deformation of the insulator 30 or the adhesion of the cells 10 to the holder 20 described above can fix the cells 10 to the holder 20. For example, the cells 10 are inserted through the associated opening portions 21 of the holder 20, and the material forming the insulator 30 is filled into the gap between the cells 10 and the opening portions 21, thereby making it possible to provide the insulator 30.

The holder 20 is fixed to a module case 40. The module case 40 has an opening portion formed in an upper face for inserting the plurality of cells 10, and the upper face of the module case 40 is covered with the holder 20. The holder 20 has a plurality of flanges 22 formed on an outer edge. The number of the flanges 22 can be set as appropriate. The module case 40 has a plurality of flanges 41 formed thereon for supporting the flanges 22. The flanges 41 are provided at positions aligned with the associated flanges 22 of the holder 20.

The flanges 22 are attached to the flanges 41 to allow the positioning of the holder 20 to the module case 40. Specifically, a portion of the flange 22 comes into contact with an outer wall face of the module case 40 to position the holder 20 to the module case 40 in the X-Y plane.

Each of the flanges 41 has a hole portion 41a formed therein, and a bolt (not shown) is inserted into the hole portion 41a. The flange 22 has a thread (not shown) into which the bolt is inserted. The bolt can be inserted into the hole portion 41a and the thread of the flange 22 to fix the holder 20 to the module case 40. In other words, the holder 20 can be prevented from moving in the Z direction relative to the module case 40.

The module case 40 surrounds the plurality of cells 10 in the X-Y plane and houses the plurality of cells 10. A bottom face 42 of the module case 40 has a plurality of opening portions 42a formed therein. The module case 40 is provided with as many opening portions 42a as the cells 10. Similarly to the opening portions 21 of the holder 20 described above, the number of the opening portions 42a can be set as appropriate. The cells 10 can be inserted into the opening portions 42a to position the respective cells 10 to the module case 40.

Thus, the area of the cell 10 closer to the negative electrode terminal 12 is positioned in the X-Y plane by the opening portion 42a of the module case 40. The area of the cell 10 closer to the positive electrode terminal 11 is positioned in the X-Y plane by the opening portion 21 of the holder 20. In this manner, both ends of the cell 10 in the longitudinal direction (Z direction) are positioned by the module case 40 and the holder 20 in the present embodiment to prevent the two cells 10 adjacent to each other in the X-Y plane from coming into contact.

The module case 40 can be formed of an insulating material such as resin. This can insulate the two cells adjacent to each other in the X-Y plane. If an outer face of the cell 10 is covered with a layer formed of an insulating material, the two cells 10 adjacent to each other in the X-Y plane can be insulated. Alternatively, the module case 40 may be formed of a conductive material. In this case, a layer formed of an insulating material can be provided on the face of the module case 40 that is opposite to the cells 10. This can insulate the module case 40 from the cell 10.

The module case 40 includes side walls 43a and 43b opposite to each other in the Y direction. The side wall 43a has a plurality of slits 44a aligned in the X direction. Each of the slits 44a extends in the Z direction and has a rectangular opening.

As described later, the slit 44a is used to introduce a heat exchange medium for use in adjusting the temperature of the cell 10 into the module case 40. Specifically, the side wall 43a is attached to a chamber (not shown) extending in the X direction and the chamber is supplied with the heat exchange medium, so that the heat exchange medium supplied to the chamber can pass through the slits 44a into the module case 40.

The side wall 43b of the module case 40 has a plurality of slits 44b aligned in the X direction. Each of the slits 44b extends in the Z direction and has a rectangular opening. As described later, the slit 44b is used to exhaust the heat exchange medium present in the module case 40 out of the module case 40. Specifically, the side wall 43b is attached to a chamber (not shown) extending in the X direction, so that the heat exchange medium can pass through the slits 44b into the chamber and then can be exhausted from the chamber.

When the cell 10 produces heat due to charge and discharge or the like, a heat exchange medium for cooling can be supplied into the module case 40 to reduce a rise in temperature of the cell 10. Specifically, heat exchange can be made between the heat exchange medium and the cell 10 to transfer the heat of the cell 10 to the heat exchange medium to reduce the rise in temperature of the cell 10. For example, air can be used as the heat exchange medium. For cooling the cell 10, the heat exchange medium can be cooled in advance to a temperature lower than the temperature of the cell 10.

When the cell 10 is extremely cooled, for example due to the external environment, a heat exchange medium for heating can be supplied into the module case 40 to reduce a drop in temperature of the cell 10. Specifically, heat exchange can be made between the heat exchange medium and the cell 10 to transfer the heat of the heat exchange medium to the cell 10 to reduce the drop in temperature of the cell 10. For example, air can be used as the heat exchange medium. For heating the cell 10, the heat exchange medium can be heated in advance by using a heater or the like to a temperature higher than the temperature of the cell 10.

A plurality of brackets 45 are provided on a lower portion of the module case 40. The bracket 45 has an opening portion 45a through which a bolt (not shown) is inserted. The bracket 45 is used in mounting the battery module 1 of the present embodiment onto particular equipment. Specifically, the bolt can be inserted through the bracket 45 to mount the battery module 1 on the particular equipment. The battery module 1 can be mounted, for example on a vehicle. In this case, the bracket 45 can be used to fix the battery module 1 to a vehicle body.

When the battery module 1 is mounted on the vehicle, a motor generator can be used to convert an electric energy output from the battery module 1 into a kinetic energy. The kinetic energy can be transferred to wheels to run the vehicle. The motor generator can also be used to convert a kinetic energy produced in braking of the vehicle into an electric energy. The electric energy can be accumulated as regenerative power in the battery module 1.

A first cover 51 is disposed over an upper face of the holder 20. The first cover 51 is omitted in FIG. 2. The first cover 51 has arm portions 51a extending in the Z direction, and the arm portion 51a has an opening portion formed at an end. Pins 23 are provided on an outer edge of the holder 20 and are inserted through the opening portions of the arm portions 51a. This can fix the first cover 51 to the holder 20.

Some space is formed between the first cover 51 and the holder 20. The space serves to accommodate bus bars 60 and 72, later described, and to move the gas exhausted through the valve provided in the cell 10. The bus bars 60 and 72 can be covered with the first cover 51 to protect the bus bars 60 and 72.

Since the first cover 51 is opposite to the positive electrode terminal 11 of the cell 10, the gas exhausted from the cell 10 moves toward the first cover 51. The space is formed between the first cover 51 and the holder 20 as described above, so that the gas exhausted from the cell 10 can be retained in the space. An exhaust duct can be connected to the space formed between the first cover 51 and the holder 20 to guide the gas exhausted from the cell 10 toward the exhaust duct.

As described above, in the present embodiment, the positive electrode terminals 11 of all the cells 10 are located at the top of the battery module 1. Thus, the gas exhausted through each of the positive electrode terminals 11 can be retained in the single space formed between the first cover 51 and the holder 20.

If the positive electrode terminals 11 of the plurality of cells 10 are disposed at an upper face and a lower face of the battery module 1, the gas is exhausted through the upper face and the lower face of the battery module 1. In this case, a gas exhaust path needs to be provided for each of the upper face and the lower face of the battery module 1 to readily increase the size of the gas exhaust path. Since the gas exhaust path is required only at the upper face of the battery module 1 in the present embodiment, the increased size of the gas exhaust path can be prevented.

The gas exhausted from the cell 10 tends to move upward. The orientation of the cell 10 with the positive electrode terminal 11 disposed at the top facilitates the exhaust of the gas from the positive electrode terminal 11.

The bottom face 42 of the module case 40 is covered with a second cover 52. The second cover 52 is formed in a shape conforming to the bottom face 42 of the module case 40. The bus bars 60 and 71, later described, are disposed between the second cover 52 and the bottom face 42. The second cover 52 is used to protect the bus bars 60 and 71.

The positive electrode terminal 11 of the cell 10 protruding from the holder 20 (insulator 30) is connected to a positive electrode tab 61 of the bus bar 60. The positive electrode tab 61 is provided at a position opposite to the positive electrode terminal 11 in the Z direction, and the positive electrode terminal 11 and the positive electrode tab 61 can be connected through welding or the like. In the present embodiment, five positive electrode tabs 61 are formed in each first area 60a of the bus bar 60, and the first area 60a is formed in a flat shape along the X-Y plane. As described above, the first area 60*a* of the bus bar 60 is disposed between the holder 20 and the first cover 51.

The number (one or more) of the positive electrode tabs 61 formed in the first area 60*a* can be set as appropriate. As later described, for electrically connecting the plurality of cells 10 in parallel, the number of the positive electrode tabs 61 formed in the first area 60*a* is set in accordance with the number of the cells 10 electrically connected in parallel. In other words, the number of the positive electrode tabs 61 formed in the first area 60*a* is equal to the number of the cells 10 electrically connected in parallel. In the present embodiment, the first areas 60*a* of the plurality of bus bars 60 have different shapes depending on the positions of the positive electrode tabs 61 formed therein.

The negative electrode terminal 12 of the cell 10 protruding from the opening portion 42*a* of the module case 40 is connected to a negative electrode tab 62 of the bus bar 60. The negative electrode tab 62 is provided at a position opposite to the negative electrode terminal 12 in the Z direction, and the negative electrode terminal 12 and the negative electrode tab 62 can be connected through welding or the like. In the present embodiment, five negative electrode tabs 62 are formed in each second area 60*b* of the bus bar 60, and the second area 60*b* is formed in a flat shape along the X-Y plane. As described above, the second area 60*b* of the bus bar 60 is disposed between the module case 40 and the second cover 52.

The number (one or more) of the negative electrode tabs 62 formed in the second area 60*b* can be set as appropriate. As later described, for electrically connecting the plurality of cells 10 in parallel, the number of the negative electrode tabs 62 formed in the second area 60*b* is set in accordance with the number of the cells 10 electrically connected in parallel. In other words, the number of the negative electrode tabs 62 formed in the second area 60*b* is equal to the number of the cells 10 electrically connected in parallel. In the present embodiment, the second areas 60*b* of the plurality of bus bars 60 have different shapes depending on the positions of the negative electrode tab 62 formed therein.

The first area 60*a* and the second area 60*b* are connected through a third area 60*c* extending in the Z direction. In other words, an upper end of the third area 60*c* is connected to the first area 60*a*, and a lower end of the third area 60*c* is connected to the second area 60*b*. The third area 60*c* is disposed outside the module case 40. The third areas 60*c* of all the bus bars 60 are aligned in the X direction and are disposed along the side wall 43*b* of the module case 40.

Figure 3:
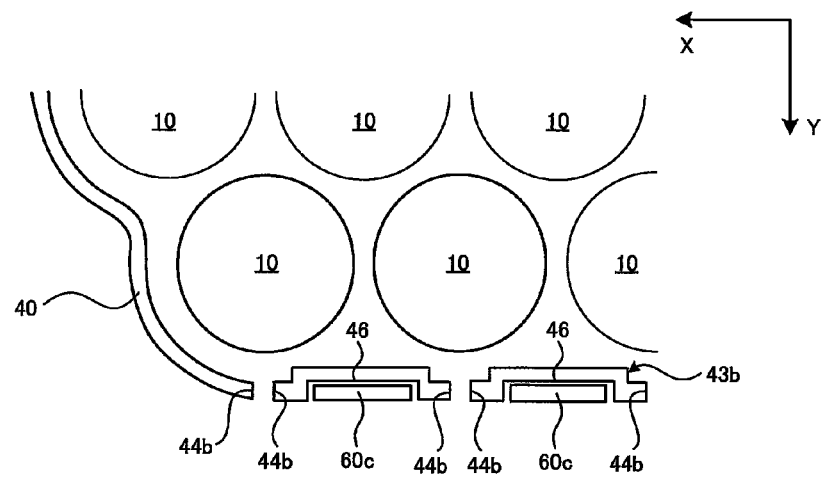
FIG. 3 A section view showing part of the battery module.

The side wall 43*b* has recessed portions 46 formed on an outer face, and the third areas 60*c* are fitted in the recessed portions 46. FIG. 3 is a section view of the battery module 1 taken along the X-Y plane and shows part of the battery module 1. As shown in FIG. 3, the recessed portion 46 is formed between the two slits 44*b* adjacent to each other in the X direction. The third area 60*c* of the bus bar 60 is located between the two slits 44*b* adjacent to each other in the X direction.

In the battery module 1 of the present embodiment, the bus bars 71 and 72 are used in addition to the bus bar 60. The bus bars 71 and 72 are provided at both ends of the battery module 1 in the X direction and have shapes different from that of the bus bar 60.

The bus bar 71 includes negative electrode tabs 71*a* for connection to the negative electrode terminals 12. The bus bar 71 is not connected to any positive electrode terminal 11. Since the bus bar 71 is connected to five negative electrode terminals 12 in the present embodiment, the bus bar 71 includes five negative electrode tabs 71*a*. The bus bar 72 includes positive electrode tabs 72*a* for connection to the positive electrode terminal 11. The bus bar 72 is not connected to any negative electrode terminal 11. Since the bus bar 72 is connected to five positive electrode terminals 11 in the present embodiment, the bus bar 72 includes five positive electrode tabs 72*a*.

A lead 71*b* provided for the bus bar 71 is used as a negative electrode terminal of the battery module 1. A lead 72*b* provided for the bus bar 72 is used as a positive electrode terminal of the battery module 1. For electrically connecting the battery module 1 to a load, the leads 71*b* and 72*b* are connected to the load through wiring.

For electrically connecting a plurality of battery modules 1 in serial, the lead 71*b* of one of the battery modules 1 is electrically connected to the lead 72*b* of another one of the battery modules 1. When the plurality of battery modules 1 as shown in FIG. 2 are aligned in the X direction, the lead 71*b* of the one of the battery modules 1 is disposed at a position adjacent to the lead 72*b* of another one of the battery modules 1. This allows the easy connection of the leads 71*b* and 72*b*.

Figure 4:
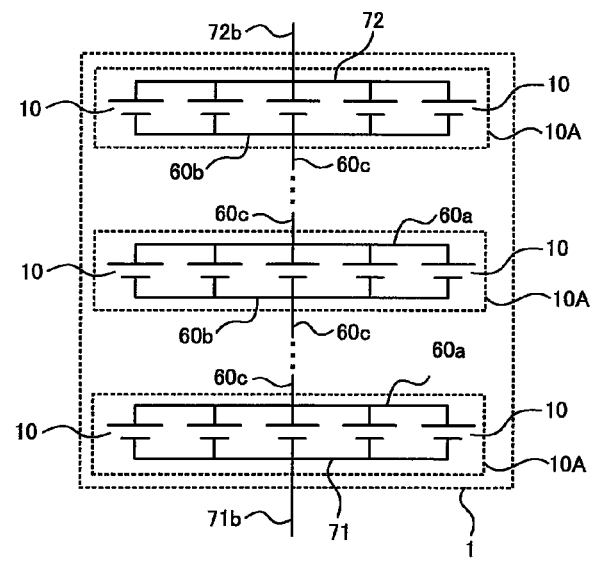
FIG. 4 A diagram showing the circuit configuration of the battery module.

The use of the bus bars 60, 71, and 72 can provide the battery module 1 having a circuit configuration shown in FIG. 4. In the present embodiment, the plurality of positive electrode tabs 61 provided in the first area 60*a* of the bus bar 60 are connected to the plurality of positive electrode terminals 11, and the plurality of negative electrode tabs 62 provided in the second area 60*b* of the bus bar 60 are connected to the plurality of negative electrode terminals 12. This can electrically connect the plurality of cells 10 in parallel. Specifically, as shown in FIG. 4, the five cells 10 can be electrically connected in parallel. The five cells 10 electrically connected in parallel constitute a single battery block 10A.

In the present embodiment, the positive electrode tab 61 in the first area 60*a* and the negative electrode tab 62 in the second area 60*b* included in one bus bar 60 are connected to different cells 10. Thus, the plurality of battery blocks 10*a* can be electrically connected in serial through the third area 60*c* of the bus bars 60. In other words, the number of the battery blocks 10A electrically connected in serial can be changed by changing the number of the bus bars 60.

In the battery block 10A located at one end of the battery module 1, the negative electrode terminals 12 of the plurality of cells 10 are electrically connected in parallel through the bus bar 71. In the battery block 10A located at the other end of the battery module 1, the positive electrode terminals 11 of the plurality of cells 10 are electrically connected in parallel through the bus bar 72.

The number of the cells 10 constituting the battery block 10A, that is, the number of the cells 10 electrically connected in parallel, can be set as appropriate. The number of the cells 10 electrically connected in parallel can be changed by changing the number of the positive electrode tabs 61 provided in the first area 60*a* of the bus bar 60 and the number of the negative electrode tabs 62 provided in the second area 60*b* of the bus bar 60. When the number of the positive electrode tabs 61 is changed, the shape of the first area 60*a* is different from the shape of the first area 60*a* shown in FIG. 1 and FIG. 2. Similarly, when the number of the negative electrode tabs 62 is changed, the shape of the second area 60*b* is different from the shape of the second area 60*b* shown in FIG. 1.

Figure 5:
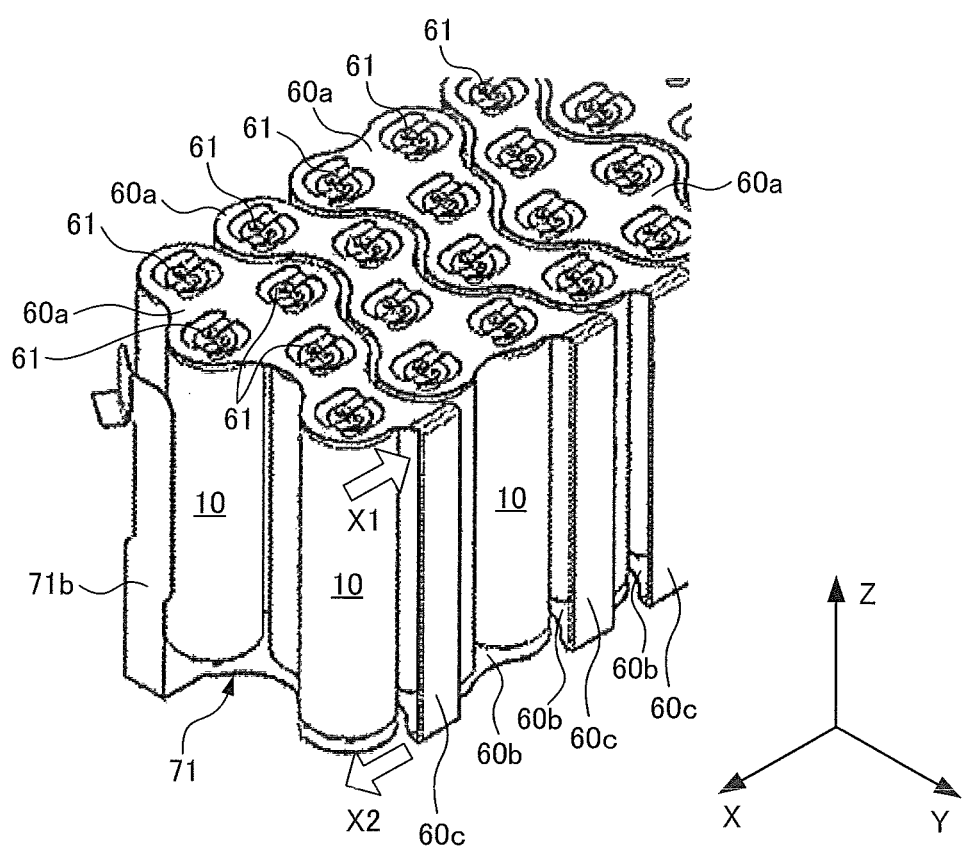
FIG. 5 A perspective view showing part of the battery module.

As shown in FIG. 5, in the present embodiment, the connecting portion of the first area 60*a* that is connected to the third area 60*c* is shifted in the direction of an arrow X1. In other words, the upper end of the third area 60*c* is shifted in the direction of the arrow X1. In addition, the connecting portion of the second area 60b that is connected to the third area 60c is shifted in the direction of an arrow X2. In other words, the lower end of the third area 60c is shifted in the direction of the arrow X2.

The directions indicated by the arrows X1 and X2 are opposite directions along the X direction. Thus, in the present embodiment, the upper end and the lower end of the third area 60c are shifted in the directions in which they are brought closer. This allows the connecting portion of the first area 60a that is connected to the third area 60c and the connecting portion of the second area 60b that is connected to the third area 60c to be opposite to each other in the Z direction. With this configuration, the third area 60c can be formed along the Z direction. In other words, the third area 60c can be formed along the longitudinal direction of the cell 10.

Although the present embodiment includes shifting the connecting portion of the first area 60a connected to the third area 60c and the connecting portion of the second area 60b connected to the third area 60c in the directions in which they are brought closer (the directions of the arrows X1 and X2), the present invention is not limited thereto. Specifically, only the connecting portion of the first area 60a may be shifted in the direction of the arrow X1 to be closer to the connecting portion of the second area 60b, thereby forming the third area 60c along the Z direction. Alternatively, only the connecting portion of the second area 60b may be shifted in the direction of the arrow X2 to be closer to the connecting portion of the first area 60a, thereby forming the third area 60c along the Z direction.

As described above, the first area 60a and the second area 60b are connected to different cells 10, that is, the cells 10 adjacent in the X direction. If the third area 60c is extended from the first area 60a toward the second area 60b, the resulting third area 60c has a shape shown in FIG. 6. In other words, the third area 60c would extend in a direction inclined with respect to the Z axis. If the third area 60c is disposed in this manner, the slits 44b of the module case 40 are partially covered with the third area 60c.

Figure 6:
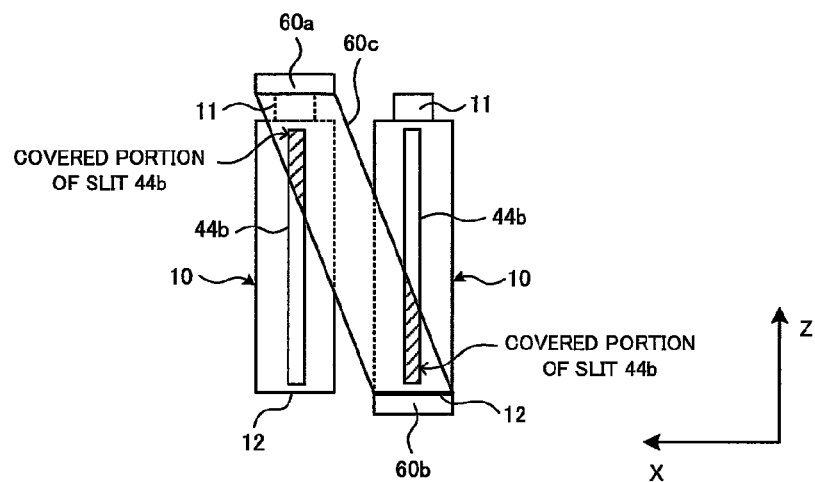
FIG. 6 A diagram showing how a bus bar obstructs slits.

If the slits 44b are formed at positions not overlapping with the third area 60c shown in FIG. 6, the slits 44b are not covered with the third area 60c. In this case, however, the efficient supply of the heat exchange medium to the cell 10 is not possible. For adjusting the temperature of the cell 10 with the heat exchange medium, it is desirable to supply the heat exchange medium to the entirety of the cell 10. It is thus preferable to flow the heat exchange medium along the longitudinal direction of the cell 10. For this reason, the slit 44b is preferably formed along the longitudinal direction of the cell 10.

According to the present embodiment, the slit 44b is formed along the longitudinal direction (Z direction) of the cell 10 while the third area 60c can be disposed at the position not overlapping with the slit 44b. It is only required that the slit 44b should extend along the longitudinal direction (Z direction) of the cell 10, and the shape of the slit 44b can be set as appropriate. Although the present embodiment includes the slit 44b formed in the rectangular shape, the slit 44b may be formed in another shape (for example, a triangular shape). It is not essential to form the slit 44 along a straight line, and the slit 44 can be formed in a wavy shape extending in the Z direction.

Figure 7:
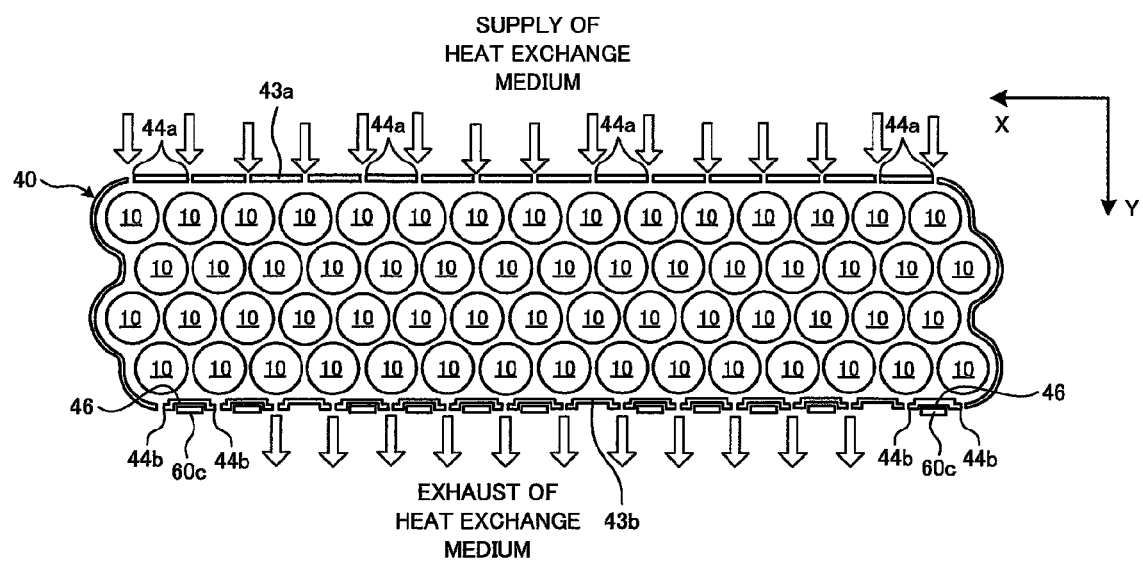
FIG. 7 A diagram for explaining the flow of a heat exchange medium in the battery module.

Next, description is made of the flow of the heat exchange medium in the battery module 1 with reference to FIG. 7. FIG. 7 is a section view of the battery module 1 taken along the X-Y plane.

The heat exchange medium supplied to the battery module 1 passes through the slits 44a of the module case 40 and then enters inside of the module case 40. As shown in FIG. 7, the slit 44a is provided at the position opposite to the cell 10 in the Y direction. After the passage through the slit 44a, the heat exchange medium comes into contact with the outer peripheral face of the cell 10. This contact of the heat exchange medium with the outer peripheral face of the cell 10 achieves the heat exchange between the heat exchange medium and the cell 10.

As described above, part of the cell 10 is inserted into the opening portion 20 of the holder 20, so that the heat exchange medium cannot be supplied to that portion. The heat exchange medium can be supplied to the remaining portion of the cell 10 that is not inserted into the opening portion 21 of the holder 20. Thus, the slit 44a formed in the module case 40 allows the efficient supply of the heat exchange medium to the cell 10.

Since a gap is formed between the two cells 10 adjacent to each other in the X-Y plane, the heat exchange medium passes through the gap formed between the two cells 10. As a result, after the passage through the slit 44a, the heat exchange medium moves toward the slit 44b. Until the heat exchange medium reaches the slit 44b, the heat exchange medium achieves the heat exchange with the plurality of cells 10. This can adjust the temperature of all the cells 10 housed in the module case 40.

The slit 44b is provided at the position opposite to the cell 10 in the Y direction. After the heat exchange with the cell 10 adjacent to the slit 44b, the heat exchange medium passes through the slit 44b and is exhausted out of the module case 40. As described above, since the third area 60c of the bus bar 60 does not cover the slit 44b (the flow path of the heat exchange medium), any retention of the heat exchange medium near the slit 44b can be prevented to efficiently exhaust the heat exchange medium through the slit 44b. Since the heat exchange medium smoothly flows in the module case 40, the supply of the heat exchange medium to the cell 10 can be facilitated, and the temperature of the cell 10 can be efficiently adjusted by the heat exchange medium.

In the present embodiment, the bus bars 60, 71, and 72 are disposed outside the module case 40. The bus bars 60, 71, and 72 produce heat in response to the passage of electric current. The placement of the bus bars 60, 71, and 72 outside the module case 40, can prevent the heat produced in the bus bars 60, 71, and 72 from being transferred to the heat exchange medium or the cell 10.

If the heat of the bus bars 60, 71, and 72 is transferred to the heat exchange medium or the cell 10 in cooling the cell 10 with the heat exchange medium, the efficient cooling of the cell 10 is not possible. In the configuration in which the heat exchange medium is moved in the inside of the module case 40 as in the present embodiment, the placement of the bus bars 60, 71, and 72 outside the module case 40 can prevent the heat of the bus bars 60, 71, and 72 from being transferred to the heat exchange medium or the cell 10. This enables the efficient cooling of the cell 10 using the heat exchange medium.

The third area 60c of the bus bar 60 may be disposed inside the module case 40. If the third area 60c of the bus bar 60 is disposed along the wall face 43b of the module case 40, the third area 30c does not interfere with the movement of the heat exchange medium in the module case 40.

Although the present embodiment includes supplying the heat exchange medium through the slit 44a and exhausting the heat exchange medium through the slit 44b, the present invention is not limited thereto. Specifically, the heat exchange medium may be supplied through the slit 44b and may be exhausted through the slit 44a. In other words, the heat exchange medium can be moved along a path in a direction opposite to the path of the heat exchange medium shown in FIG. 7. In this case, the bus bar 60 does not cover the slit 44b, and the heat exchange medium can be supplied efficiently to the cell 10 as described above.

Although the present embodiment includes the third area 60c of the bus bar 60 placed between the two slits 44b adjacent to each other in the X direction, the present invention is not limited thereto. Specifically, it is only required that the slit 44b and the third area 60c should be formed along the longitudinal direction (Z direction) of the cell 10 and should be formed at positions shifted in the X direction. This positional relationship between the slit 44b and the third area 60c allows the efficient supply of the heat exchange medium to the cell 10 and prevents the slit 44b from being covered with the third area 60c.

In the present embodiment, the positive electrode terminal (the lead 72b of the bus bar 72) of the battery module 1 and the negative electrode terminal (the lead 71b of the bus bar 71) of the battery module 1 are provided at both ends of the battery module 1 in the X direction. This allows the positive electrode terminal and the negative electrode terminal of the battery module 1 to be disposed at the positions not interfering with the moving path of the heat exchange medium shown in FIG. 7.

Since the longitudinal direction of the cell 10 is defined at the Z direction in the present embodiment, the height of the battery module 1 (length in the Z direction) can be equal to the height of the cell 10 (length in the Z direction). As a result, even when the number of the cells 10 is increased, the height of the battery module 1 is not changed.

When the battery module 1 is mounted on the vehicle, the height of the battery module 1 is important in terms of mounting space. In general, the vehicle needs to have a space where an occupant rides and a luggage space, and it is difficult to include a large mounting space for the battery module 1 in an up-down direction of the vehicle. In the present embodiment, as described above, the height of the battery module 1 is equal to the height of the cell 10, and even when the number of the cells 10 is increased, the height of the battery module 1 is not changed. The height of the battery module 1 is determined by the height of the cell 10 in this manner to facilitate the mounting of the battery module 1 on the vehicle.

Although the present embodiment involves using the third area 60c of the bus bar 60 to electrically connect the plurality of cells in serial, the present invention is not limited thereto. Specifically, the third area 60c of the bus bar 60 may be used to electrically connect the plurality of cells 10 in parallel. In this case, at least two cells 10 electrically connected in parallel through the third area 60c need to have different orientations such that the positive electrode terminals 11 (or the negative electrode terminals 12) are disposed at opposite ends. Specifically, the positive electrode terminal 11 of one of the cells 10 may be disposed at the upper end of the battery module 1, and the positive electrode terminal 11 of the other of the cells 10 may be disposed at the lower end of the battery module 1.

The invention claimed is:

1. An electric storage apparatus comprising:
   a plurality of electric storage elements, each of the elements extending in a predetermined direction and having a positive electrode terminal and a negative electrode terminal at both ends in the predetermined direction, the elements being aligned in a plane orthogonal to the predetermined direction;
   a bus bar electrically connecting the plurality of electric storage elements; and
   a case housing the plurality of electric storage element,
   wherein the case has an opening portion being configured to pass a heat exchange medium in a direction orthogonal to the predetermined direction and an opening surface of the opening portion extending in the predetermined direction,
   wherein the heat exchange medium is used in adjusting a temperature of the electric storage element,
   wherein the bus bar includes:
      a first bus bar including a positive electrode tab connected to the positive electrode terminal and extending in the direction orthogonal to the predetermined direction;
      a second bus bar including a negative electrode tab connected to the negative electrode terminal and extending in the direction orthogonal to the predetermined direction; and
      a third bus bar extending in the predetermined direction and including a first end connected to the first bus bar and a second end connected to the second bus bar,
   wherein the first bus bar and the second bus bar are opposite to each other via the third bus bar in the predetermined direction, and
   wherein the third bus bar is disposed along a wall face of the case having the opening portion formed therein, the third bus bar being disposed at a position different from a position of the opening portion.

2. The electric storage apparatus according to claim 1, wherein the opening portion comprises a plurality of opening portions, and the case includes the plurality of opening portions aligned in a direction orthogonal to the predetermined direction, and
   the third bus bar is located between two of the opening portions adjacent to each other in the direction orthogonal to the predetermined direction.

3. The electric storage apparatus according to claim 1, wherein the opening portion is an opening portion configured to allow supply of the heat exchange medium to the electric storage element or an opening portion configured to allow exhaust of the heat exchange medium after heat exchange with the electric storage element.

4. The electric storage apparatus according to claim 1, wherein the bus bar is disposed outside the case.

5. The electric storage apparatus according to claim 1, wherein the positive electrode tab comprises a plurality of positive electrode tabs, and the first bus bar includes the plurality of positive electrode tabs, and
   the negative electrode tab comprises a plurality of negative electrode tabs, and the second bus bar includes the plurality of negative electrode tabs.

6. The electric storage apparatus according to claim 1, wherein a connecting portion of the first bus bar connected to the third bus bar and a connecting portion of the second bus bar connected to the third bus bar are opposite to each other in the predetermined direction.

7. The electric storage apparatus according to claim 1, wherein the positive electrode terminals of the plurality of electric storage elements are located in a plane orthogonal to the predetermined direction.

8. The electric storage apparatus according to claim 1, further comprising a holder holding each of the plurality of electric storage elements, wherein the case surrounds an area of each of the electric storage elements, the area being not held by the holder.

9. The electric storage apparatus according to claim 1, wherein the electric storage elements disposed at different positions in a direction orthogonal to the predetermined direction are electrically connected in serial through the bus bar, and
a positive electrode terminal and a negative electrode terminal of the electric storage apparatus are provided at both ends of the case in the direction orthogonal to the predetermined direction.

10. The electric storage apparatus according to claim 1, wherein the electric storage elements has a circular shape in section orthogonal to the predetermined direction.

11. The electric storage apparatus according to claim 2, wherein the opening portion is an opening portion configured to allow supply of the heat exchange medium to the electric storage element or an opening portion configured to allow exhaust of the heat exchange medium after heat exchange with the electric storage element.

12. The electric storage apparatus according to claim 2, wherein the bus bar is disposed outside the case.

\* \* \* \* \*